United States Patent

[11] 3,608,859

| [72] | Inventor | Walter Hetzer |
| | | Haidholzen, Germany |
| [21] | Appl. No. | 816,324 |
| [22] | Filed | Apr. 15, 1969 |
| [45] | Patented | Sept. 28, 1971 |
| [73] | Assignee | Messerschmitt-Bolkow Gesellschaft |
| | | Mit Beschrankter Haftung |
| | | Ottobrunn bei Munich, Germany |
| [32] | Priority | Apr. 23, 1968 |
| [33] | | Germany |
| [31] | | P 17 50 341.2 |

[54] CONTROLLABLE CHECK VALVE
1 Claim, 1 Drawing Fig.

[52] U.S. Cl. .................................................. 251/63.4, 251/282
[51] Int. Cl. .......................................................... F16k 31/43
[50] Field of Search ........................................... 251/63.4, 282

[56] References Cited
UNITED STATES PATENTS

| 680,737 | 8/1901 | Schutte | 251/282 |
| 2,783,020 | 2/1957 | Kleczek | 251/282 X |
| 2,829,664 | 4/1958 | Mountford | 251/282 X |
| 3,082,991 | 3/1963 | Watkins | 251/282 X |

Primary Examiner—Arnold Rosenthal
Attorney—McGlew and Toren

ABSTRACT: A controllable check valve, for a hydraulic system, includes a relatively elongated body having means defining a valve zone, fluid inlet means and fluid outlet means. The body is formed with a frustoconical valve seat between the inlet and outlet means. A valve member is displaceable longitudinally in the body and is formed with a frustoconical valve seating surface sealingly engageable with the valve seat. Stems extend in opposite longitudinal directions from the frustoconical valve seating surface, and slide in closely fitting bores in the valve body to serve as guides for the valve member. During longitudinal displacement of the valve member, these stems project through the valve zone through at least the length of the possible valve stroke. Packings are provided in the valve housing, spaced from the valve zone, and engage the stems which extend outside the valve zone in at least one operating position of the valve member.

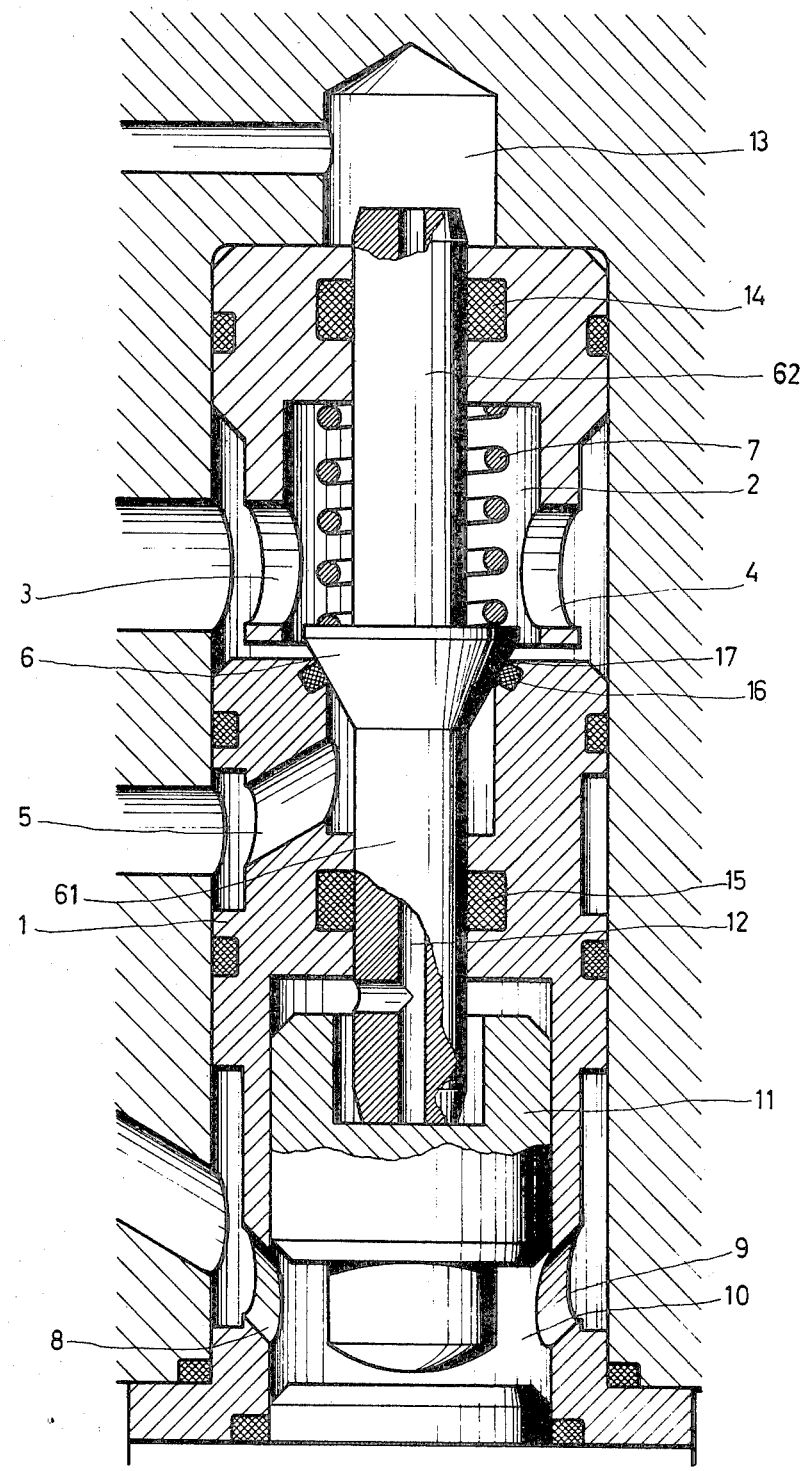
INVENTOR
Walter Hetzer

CONTROLLABLE CHECK VALVE

BACKGROUND OF THE INVENTION

In hydraulic systems, and particularly whenever an absolutely fluidtight seal and substantially no leakage oil losses are required, it is known to use a controllable check value having a frustoconical valve seat and valve-seating surface.

Known controllable check valves have the disadvantage that, when their operating state changes, they vary the volume of the valve zone effective for the hydraulic fluid so that, upon closing or opening of the valve, there occurs a displacement or intake of hydraulic fluid within the system. This is disadvantageous, particularly for hydraulic systems where a very accurate fixation and maintenance of control variables, adjusted for example by a hydraulic control system, are required. Thus, it is unacceptable, for example in hydraulic aiming and firing systems for missiles, that, at the termination of the aiming operation, there occurs, due to the closing of known check valves and the resulting variation of the valve zone volume, a subsequent displacement which, though small, impairs the accuracy of the missiles to be fired, by way of servomotors adjusting the aiming device as to azmuth and elevation.

There are known multiple valves used in hydraulics, and which are able to open and close hydraulic lines without the occurrence of variation of the valve zone volume effective for the inflow and outflow lines. These multiple valves, however, have design-caused leakage oil losses, so that a leakproof seal of the lines connected through the valves is not possible. While an adjustment of a servomotor controlled by these values is maintained unchanged, even after the closing of such a valve, by external forces acting on the servomotor and which, in aiming and firing systems, result from reaction forces or static weight moments occurring during firing, there may occur a displacement of the setting member which is made possible because of the leakage oil losses of the valve.

SUMMARY OF THE INVENTION

This invention relates to controllable check valves for hydraulic systems and, more particularly, to an improved controllable check valve having frustoconical valve seat surfaces and in which in all operating positions of the valve, the volume of fluid in a valve zone is maintained constant.

In accordance with the invention a controllable, absolutely tightly closing check valve, is provided, and presents, in any operating state, a constant valve zone volume effective for the hydraulic fluid. The valve is in the form of controllable check valve having frustoconical valve seating surfaces, and is used for hydraulic systems. In accordance with the invention, the valve body is so designated that in any operating position of the valve the latter displaces the same volume within the valve zone.

In a preferred form of construction of a controllable check valve embodying the invention, the valve body has, considered longitudinally of its direction of movement, stems designed as guides and extending in opposite directions from a valve seat. In a longitudinal direction, these stems extend through the valve zone by at least the length of the possible valve stroke with reference to the direction of operation of the valve.

By such a design of the valve body, it is assured that, upon a movement of the valve due to opening or closing of the check valve, the volume of the valve body leaving the valve zone on one side is replaced by a corresponding volume of the valve body coming into the valve zone on the opposite side. It is thus possible, in any operating position of the displaceable valve member, to displace the same volume within the valve zone.

In further accordance with the invention, packings are provided and are inset with the valve housing, at locations separated from the valve zone, for engagement with the stems extending partly outside the valve zone at least in one operating position of the valve. Since known check valves with frustoconical shaped valve seating surfaces do not have leadage oil losses, due to their design, it is assured, with this arrangement, that no leakage losses occur in the invention valve although parts of the valve member leave the valve zone in the various operating positions of the valve.

An object of the invention is to provide an improved controllable check valve for hydraulic systems.

Another object of the invention is to provide such a controllable check valve including an elongated body having means defining a valve zone, fluid inlet means and fluid outlet means, the body being formed with a frustoconical valve seat between the inlet and outlet means.

A further object of the invention is to provide such a controllable check valve including a valve member displaceable longitudinally in the body and formed with a frustoconical valve seating surface sealingly engageable with the valve seat.

Another object of the invention is to provide such a controllable check valve including means operatively associated with the valve member and maintaining the volume of fluid in the valve zone constant in all operating positions of the valve member.

A further object of the invention is to provide such a controllable check valve including stems extending in opposite directions from the valve seat and extending through the valve zone during longitudinal movement of the valve, through at least the length of the maximum valve stroke possible in the particular direction of movement of the valve.

Another object of the invention is to provide such a controllable check valve including packings preventing oil leakage past the stems.

An understanding of the principles of the invention, reference is made to the following description of a typical embodiment thereof as illustrated in the accompanying drawings.

BRIEF DESCRIPTION OF THE DRAWING

In the drawings, the singe FIGURE is a longitudinal or axial sectional view through a controllable check valve embodying the invention and with the valve in the closed position.

DESCRIPTION OF THE PREFERRED EMBODIMENT

Referring to the drawing, a valve housing 1 is formed with a valve zone 2 through which ports 3 and 4 are connectable with a port 5. Ports 3 and 4 may communicate, for example within a hydraulic system which has not been illustrated, with a source of pressure oil or a control valve, and port 5 may be connected to a hydraulic servomotor. Alternatively, port 5 can be connected to the source of fluid under pressure and a line connected to ports 3 and 4 can be connected to the hydraulic servomotor.

A valve body 6 is guided for longitudinal movement in valve housing 1, and has a frustoconical valve seating surface which is cooperable with a mating valve seat 17 in valve housing 1. When seating surface 6 engages seat 17, communication between ports 3 and 4 and port 5 is interrupted. Valve body 6 is provided, in a known manner, with the return spring 7 which closes the valve when an opening force has been released or dissipated.

A suitable sealing packing is inserted into the valve seat 17.

The illustrated check valve is hydraulically controllable and, for this purpose, hydraulic fluid can flow through ports 8 and 9 into a work zone 10 to exert pressure on a control piston 11 which, in turn, actuates valve body 6 to the open position. Word zone 10, for the control of the check valve, is completely separated from the actual valve zone 2 of the control valve. To be able to compensate the displacement of hydraulic fluid occuring during an opening movement of the check valve, resulting from displacement of control piston 11, body 6 is formed with a longitudinal bore 12 which discharges the hydraulic fluid, displaced from the back of control piston 11, through a cavity 13 connected with a fluid return line which has not been shown in further detail. Upon closing of the check valve and a resulting corresponding movement of control piston 11, the volume behind he control piston, cleared by the latter during its movement of the valve to an open position, is refilled with hydraulic fluid through bore 12.

On both sides of valve zone 2, in valve housing 1, there are provided packings 14 and 15 having a close sealing fit with valve body 6, and these packings suppress any leakage oil losses during movement of body 6.

Also, on both sides of the frustoconical valve-seating surface there are short rods or stems 61 and 62. These stems 61 and 62 project through valve zone 2 in a longitudinal direction at least so far that, in any operating position of the valve, they maintain the volume of fluid in valve zone 2 at a constant value. At the same time, stem 61 and 62 serve, in a known manner, to guide valve body 6.

When, during a closing of the check valve, valve body 6 moved out of the open position, hydraulic fluid is displaced out of that valve zone portion connecting with port 5 but, until just before the frustoconical seating surface of the valve body 6 strikes against the control edge or valve seat of valve housing 1, which mates with it, the hydraulic fluid flows off into the valve zone portion connected with ports 3 and 4, and thereby fills up, with hydraulic fluid, the corresponding volume enlargement therein caused by movement of valve body 6. Also, upon closing of the check valve, of displacement of hydraulic fluid through port 5 or, respectively, an intake of fluid through ports 3 and 4, cannot occur.

What is claimed is:

1. A controllable check valve, for a hydraulic system, comprising, in combination, a relatively elongated body having means defining a valve zone, fluid inlet means and fluid outlet means, said body being formed with a frustoconical valve seat between said inlet and outlet means; a valve member displaceable in said body and formed with a frustoconical valve seating surface sealingly engageable with said valve seat; and means operatively associated with said valve member and maintaining the volume of fluid in said valve zone constant in all operating positions of said valve member; said last named means comprising a pair of stems extending in opposite longitudinal directions from said valve seating surface and guidingly engaged in said valve body to guide said valve member; said stems extending through said valve zone, in a longitudinal direction, through at least the extent of the maximum possible valve stroke in a respective direction; said valve body being formed with a working zone completely separated from said valve zone; a piston movable in said working zone and engaged with one of said stems; and means for applying fluid pressure to an outer surface of said piston to move said valve member from a closed position to an open position; means biasing said valve member to the closed position; and a bore extending centrally through said valve member and through said stems and communicating, at one end, with the space beneath said piston and, at the other end, with a fluid return line.